Aug. 3, 1954

A. LIGUORI 2,685,613

CODE SIGNAL REGENERATOR

Filed Jan. 14, 1952

4 Sheets-Sheet 1

INVENTOR
Anthony Liguori
BY
Charles H. Brown
ATTORNEY

INVENTOR
Anthony Liguori
BY
Charles H. Brown
ATTORNEY

INVENTOR
Anthony Liguori
BY
Charles H. Brown
ATTORNEY

Aug. 3, 1954 A. LIGUORI 2,685,613

CODE SIGNAL REGENERATOR

Filed Jan. 14, 1952 4 Sheets-Sheet 4

INVENTOR
Anthony Liguori
BY
Charles H. Brown
ATTORNEY

Patented Aug. 3, 1954 2,685,613

UNITED STATES PATENT OFFICE 2,685,613

CODE SIGNAL REGENERATOR

Anthony Liguori, New York, N. Y., assignor to Radio Corporation of America, a corporation of Delaware Application January 14, 1952, Serial No. 266,386

The terminal fifteen years of the term of the patent to be granted has been disclaimed 15 Claims. (Cl. 178—70)

The invention relates to telegraph signalling circuits, and particularly to circuit arrangements for regenerating distorted telegraph signals to a form satisfactory for application to printers or other code handling apparatus.

Regenerators or regenerative repeaters are known which are part electronic and part electro-mechanical. In such regenerators the electro-mechanical portion usually consists of relays, or brushes sweeping over faceplates, or both. A large degree of maintenance is necessary in such electro-mechanical portions to insure satisfactory operation at all times. Another disadvantage of the prior art regenerator arrangements is that the outgoing circuit is often closed in the absence of incoming signals or upon faulty operation of the regenerator itself as a result of which the attention of a skilled operator is required.

Therefore, it is an object of the invention to provide an improved electronic circuit for regenerating code signals which is completely automatic and free from mechanical, operating and maintenance difficulties.

It is another object of the invention to provide an improved electronic circuit which automatically presents spacing signals to the outgoing line in the absence of received signals or upon faulty operation of any part of the regenerator circuitry.

It is a more specific object of the invention to provide an improved completely automatic electronic circuit which accepts distorted 5-unit, 1.41-stop-pulse telegraph printer signals and automatically retransmits undistorted signals.

A further object of the invention is to provide an improved timing circuit for use with start-stop telegraph signal regenerators and like arrangements which is stable and accurate in operation while readily adjustable to different conditions of operation.

The objects of the invention are achieved in a circuit arrangement in which the received signals are automatically applied to an integrating mark/space detector and output signals corresponding to the received signals are regenerated in the detector and automatically connected by electronic switching means to output terminals.

The mark/space detector determines the nature of the signal element to be regenerated by charging a capacitor during spacing intervals only. If a charge corresponding to a predetermined percentage of a baud element is developed across the capacitor the element is assumed to have been spacing. If the charge is less than the predetermined amount, the element is assumed to have been marking. Reading of the charge on the capacitor is effected at the end of each signal element as determined by the arrival of a pulse from a local timing unit. The start of the regenerated element occurs exactly one baud element after the start of the received signal element. In other words, the regenerated signal is one baud element behind the incoming signal in time.

Since the local timing unit is set into operation by the first transition from mark-to-space, that is, supposedly the beginning of the start pulse, any transition occurring when the local timing unit is not active, whether caused by the start pulse or by a burst of interference, will cause the regenerator to start cycling.

A false start detector is provided to prevent the regenerator from cycling when a signal other than a true start pulse is received. This is accomplished by comparing the charge on the integrating capacitor with a fixed voltage. Insufficient charge on the integrating capacitor results in the formation of a pulse which prevents the timing unit from cycling.

An output signal selector is employed to apply the proper signal to the output terminals under all conditions. Under normal conditions, the regenerated signal is connected through an electronic switch to the output terminals. During conditions of solid marking or solid spacing, the input signal is connected through the electronic switch to the output terminals. Included in this section are circuits to apply spacing signal elements to the output terminals in case of failure of components in the regenerator.

A feature of the invention is a timing unit comprising a locking circuit, hereafter called the timing control circuit, a start-stop oscillator and a counting chain. The received start pulse triggers the timing control circuit and starts the oscillator. The counting chain counts a predetermined number of complete cycles and restores the timing control circuit and stops the oscillator. Any speed of operation can be achieved by the proper choice of oscillator frequency.

The invention will be described in detail with reference to the accompanying drawing forming part of the specification and in which.

Figure 1:
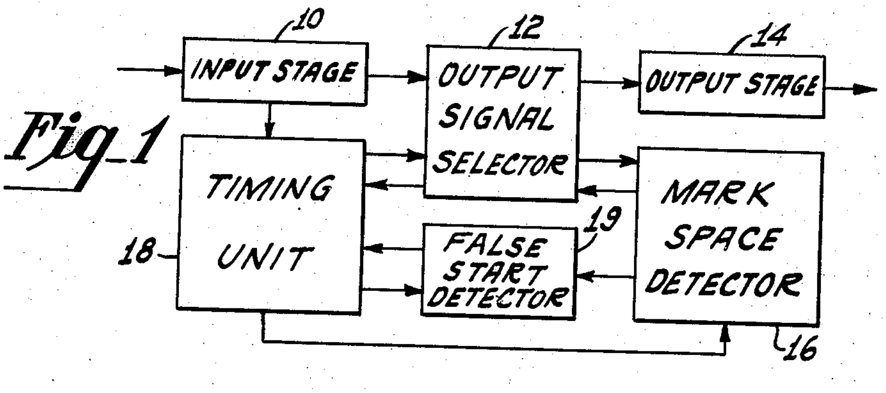
Fig. 1 is a functional diagram of a signal regenerator circuit arrangement according to the invention.

Referring to Fig. 1 there is shown a functional diagram of a code signal regenerator according to the invention wherein received 5-unit signals are applied to an input stage 10 having output connections to an output signal selector 12 incorporating electronic switch circuitry selectively to connect the signals from the input stage 10 to an output stage 14 for utilization in known manner. Alternately, the signal from the input stage 10 is connected through the electronic switching circuitry in the output signal selector 12 to a mark/space detector 16 and from which a regenerated output signal is applied to an output stage 14. A timing unit, 18 synchronized by a connection to the input stage 10, is arranged to provide properly timed waves for actuating the elements of the system in proper phase relationship and a false start detector 19 is coupled between the mark/space detector 16 and the timing unit 18 to prevent cycling on short spurious bursts of interference.

The following detailed description of a preferred circuit arrangement for performing the above described function is presented in somewhat different order to more clearly set forth the inter-relationship between the components. It should also be understood that while the following description for convenience is based on a 5-unit, 1.4-stop-pulse code, it is within the scope of the invention to accommodate any fixed length code having one signal element of length greater than the remaining elements.

Figure 2A:
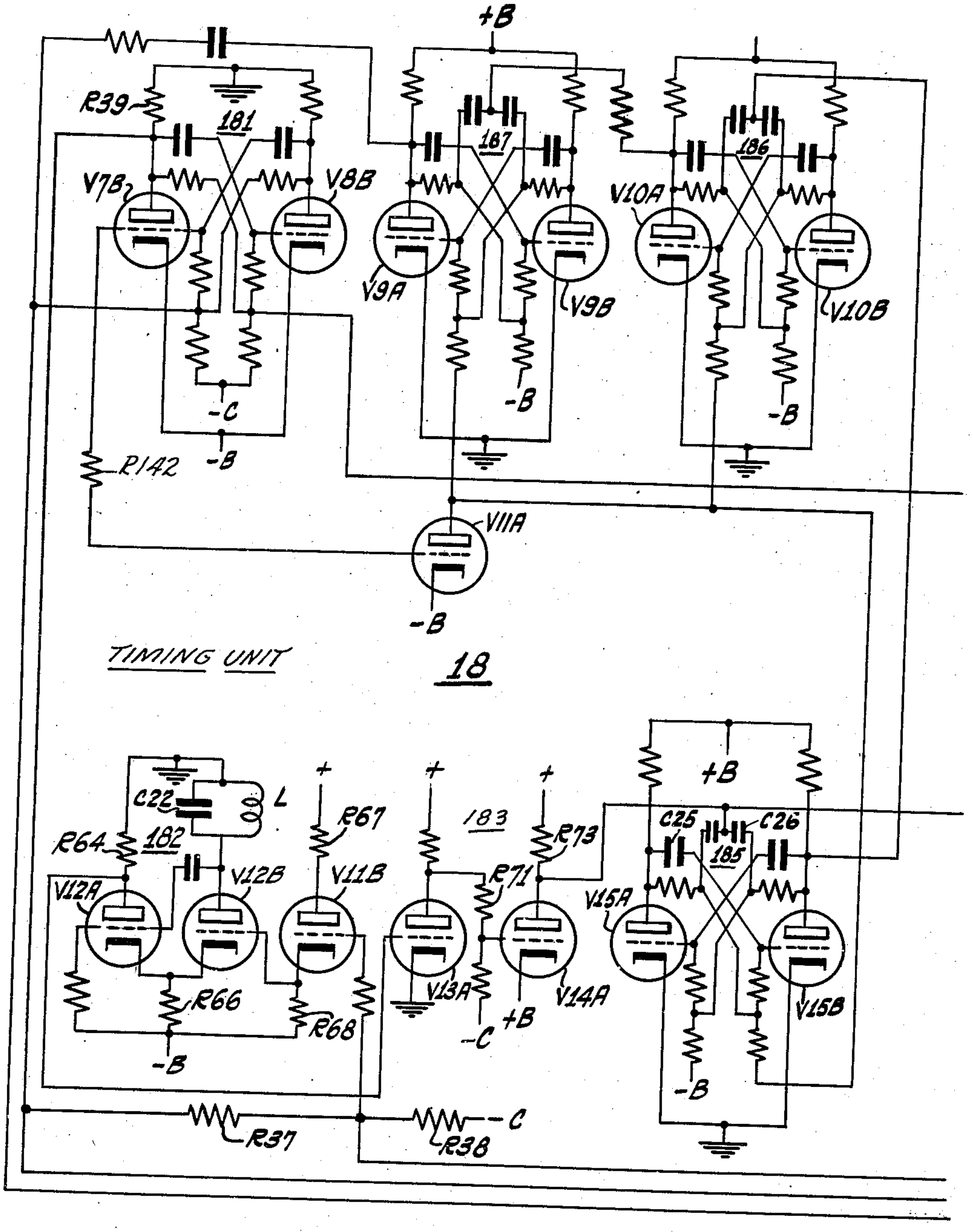
Fig. 2 is a schematic diagram of a preferred electronic circuit arrangement according to the invention for performing the functions illustrated in Fig. 1; and Fig' 3 is a graphical representation of pertinent waveforms developed in the circuit arrangement shown in Fig. 2.
Figure 2B:
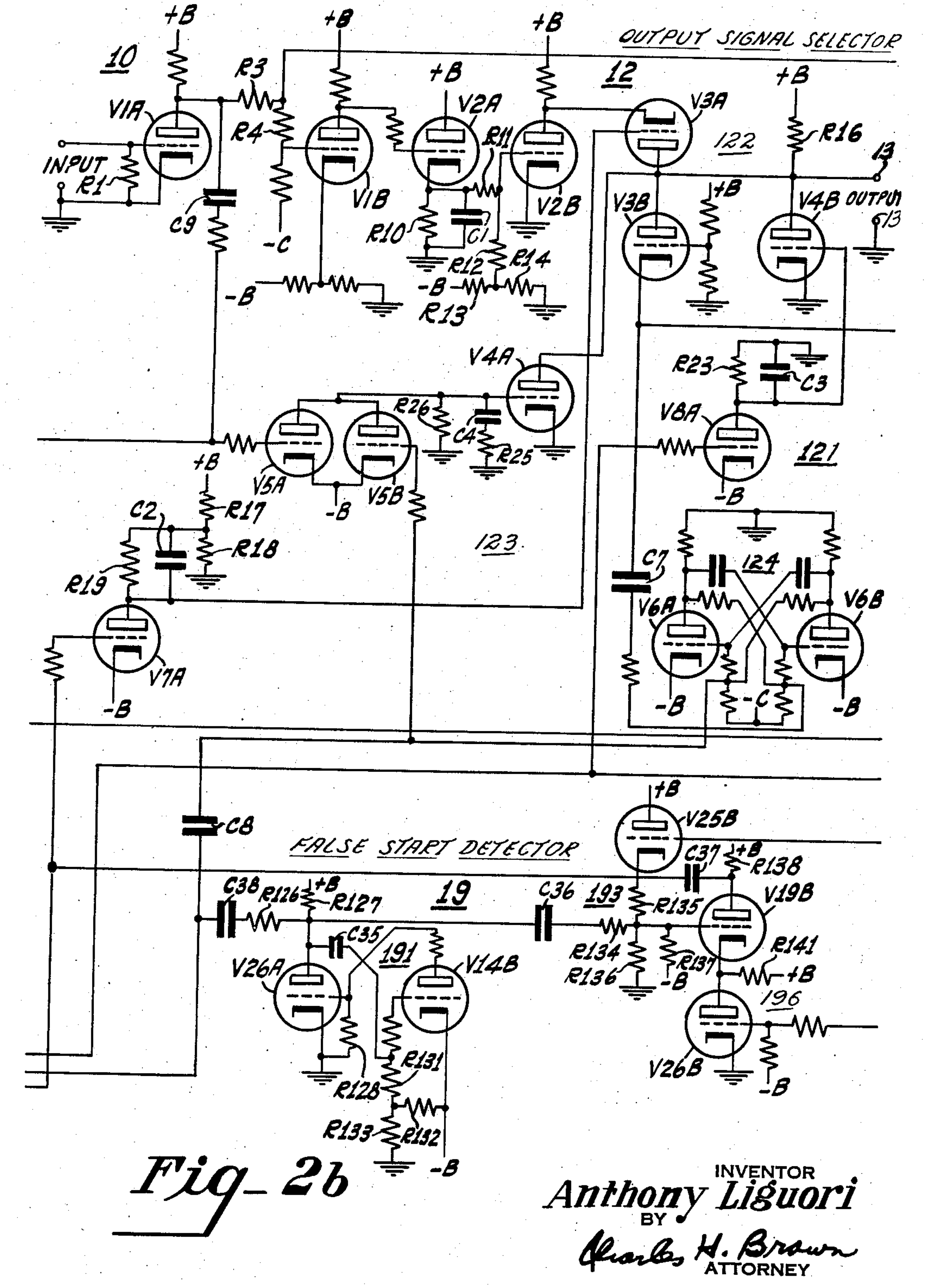

The input stage 10 is shown, in the upper left corner of Fig. 2*b*, by way of example only as a triode tube V1A having a resistor R1 in the grid circuit, across which the incoming signal is applied. In practice the incoming signal is of negative polarity for marking elements and zero potential for spacing elements so that the triode tube V1A is conducting only on spacing elements thereby producing a train of positive pulses corresponding to the marking elements of the incoming signal. It is to be clearly understood, however, that any form of input stage may be used, consistent with the signal to be handled, to provide positive polarity output pulses corresponding to mark signal elements.

The 5-unit, start-stop printer signal is composed of seven pulses. Five of these pulses identify the character being transmitted, and two pulses are provided for synchronizing purposes, namely, a start pulse and a stop pulse. The start pulse and the five signal pulses are of unit length or time duration, and the stop pulse is approximately 1.41 times unit length or time duration to allow for speed differences between the transmitting and the receiving apparatus. Hereinafter, each pulse of unit length is termed a baud element or "baudel" for convenience.

TIMING UNIT

The function of the timing unit 18 is to generate a train of eight timing pulses equally spaced in time; the time spacing being equal to one baud element or "baudel." This is accomplished by a bistable reciproconductive circuit, hereinafter called the timing control circuit and a timing wave generating circuit comprising, a start-stop oscillator and a chain of pulse counting circuits. A start pulse obtained from the incoming signal is applied to the timing control circuit to trigger the same to a given state of conduction and start the oscillator. The chain of counting circuits are effective to count seven complete cycles of the oscillator output, whereupon the timing control circuit is triggered to the complementary or reciprocal state of conduction, and stop the oscillator. Any speed of operation can be obtained by proper choice of oscillator frequency.

The timing unit 18 as shown in detail in Fig. 2*a*, comprises a timing control circuit 181, a start-stop oscillator 182, a limiting or clipping stage 183, and three bistable reciproconductive binary counter circuits 185–187. The timing control circuit 181 comprises two triode tubes V7B and V8B arranged in a known reciproconductive circuit which is perhaps more familiarly termed a bistable multivibrator circuit and is sometimes referred to as a locking circuit.

Under static conditions, referred to hereinafter as the idle condition, the tube V8B will be conducting and the tube V7B will be blocked. In this condition, the anode of the tube V7B is very much positive with respect to —B. This positive potential is applied through the voltage divider comprising two resistors R37 and R38 to the grid of an oscillator control tube V11B causing that tube to conduct. When the oscillator control circuit comprising the tube V11B is conducting, a positive potential is developed across a resistor R68. This developed potential is applied to the grid of a triode tube V12B, which in conjunction with another triode tube V12A and associated components constitute the two-terminal oscillator 182. Application of positive voltage to the grid of the tube V12B causes a large amount of current to flow through a resistor R66, tube V12B and through the oscillator coil L. This current flow saturates the coil L and causes oscillation to cease immediately. The tube V12A is blocked by the positive voltage developed across the resistor R66. By careful selection of the value of the resistor R68, the proper value of positive voltage will be applied to the grid of the tube V12B to provide the correct amount of current flow through the tube V12B, and all transients will be minimized. When the tube V11B is blocked, that is, no current flowing through the resistor R68, oscillations begin immediately at maximum amplitude. The action of this oscillator is more fully described in U. S. Patent 2,505,368 issued April 25, 1950, to E. R. Shenk and A. Liguori.

In the idle condition, the tube V11A is also nonconducting since the grid of the tube V11A is tied to the grid of the tube V7B through a resistor R142. This removes the —B supply from one grid return of each of the three bistable reciproconductive circuits 185–187. Removal of —B causes the grids of the tubes V9A, V10A, and V15B to be returned to +B, to maintain tubes V9A, V10A and V15B conducting and the counter circuits locked in that condition. This clamping circuit is necessary to prevent random conduction of these circuits so that the proper count can be had at all times.

Tubes V13A and V14A are two stages of amplification and clipping. The output of the two terminal oscillator 182, developed across R64 is squared up and applied as square waves to the first stage 185 of the binary counting chain by way of capacitors C25 and C26.

When a negative pulse from the tube V1A is applied by way of a capacitor C9 (Fig. 2*b*) to the grid of tube V8B, that tube is cut off and the complementary tube V7B conducts. This state of conduction is known as the active condition. The only function of the pulses from the tube V1A through the capacitor C9 is to block the tube V8B if it is conducting. The pulses cannot cause the tube V8B to conduct under any circumstance.

As the anode of the tube V7B goes negative and the tube V11B is blocked, causing the oscillator 182 to begin oscillating immediately. When the tube V7B starts to conduct, the counter resetting tube V11A starts to conduct and this returns —B to the grid return resistors of the tubes V9A, V10A and V15B. The binary chain is thus ready to start counting. The action of binary counters is well known and will not be described in detail.

The blocking of current flow through the resistor R66 causes the tube V12A to conduct. Removal of current flow from the coil L causes the tank circuit comprising the coil L and the capacitor C22 to oscillate immediately. As V12A conducts, a negative voltage is developed across the resistor R64 and applied to the grid of the clipping tube V13A. This tends to cut off the tube V13A and the anode of the tube V13A goes positive. Since the grid of the tube V14A is tied through a resistor R71 to the anode of the tube V13A, the tube V14A conducts and a negative voltage is developed across an anode resistor R73 and applied to the binary counting chain. Thus at the beginning of the first cycle a negative pulse is applied to the binary chain. At the end of the first cycle, since the tube V12A is starting to conduct again, another negative pulse is applied to the binary chain. The binary chain is arranged to count eight pulses before a negative pulse is forthcoming from the anode of the tube V9A. It takes seven full cycles of the oscillator to produce eight negative pulses. At the eighth negative pulse applied to the binary chain, the negative pulse developed at the anode of the tube V9A is applied to the grid of the tube V7B to block the same and cause the tube V8B to conduct. This is the idle condition and the circuits return to the initial state as explained before.

Since in this instance seven full cycles are required, three stages of binary counters are used but it is obvious that any number of counting stages can be used to achieve any desired count. Since the negative pulses are created when the voltage across the tank circuit is going through zero, there is substantially no energy in the tank circuit so there is essentially no transient response. Stopping the oscillator at any other portion of its cycle results in energy being left in the tank circuit causing transient response.

The complete action is thus seen to be; the first negative pulse from the tube V1A through the capacitor C9 triggers the timing control circuit 181 permitting the oscillator 182 to cycle seven times and then a negative pulse from the tube V9A applied through the capacitor C12 restores the timing control circuit to the initial or idle condition.

The square waves generated by the tube V14A across the resistor R73 are also applied to the mark/space detector 16 through a capacitor C34.

MARK/SPACE DETECTOR

The function of the mark/space detector 16 is to determine whether a given baud element or "baudel" of input signal is to be regenerated as a marking or a spacing element. This is done by charging a capacitor during spacing intervals only. If a charge corresponding to a predetermined percentage of a baudel is developed across the capacitor, the baudel is assumed to have been a spacing element. If the charge is less than the predetermined amount, the baudel is assumed to have been a marking element. The charge on the capacitor is read at the end of each signal baudel as determined by the arrival of a pulse from the local timing unit 18. The start of the regenerated baudel occurs exactly one baudel after the start of the received signal baudel. In other words, the regenerated signal is one baudel behind the incoming signal in time.

Figure 2C:
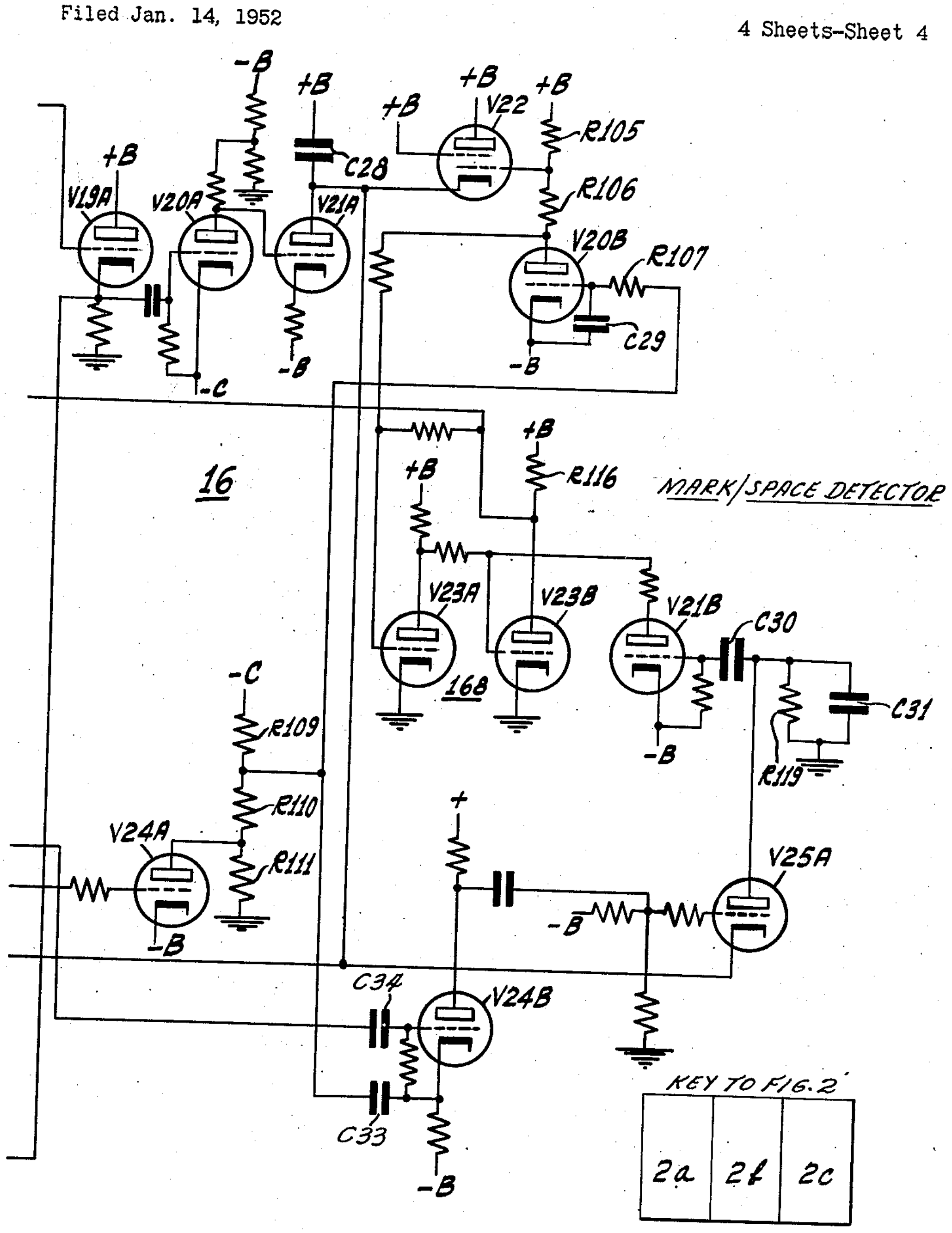

The mark/space detector as shown in detail in Fig. 2c, is a modification of the circuit described in the copending U. S. patent application Serial No. 106,998 filed July 27, 1949, of L. J. Goldfischer (now U. S. Patent 2,606,975 issued August 12, 1952) for "An Integrating Type Telegraph Signal Detector."

The received signals are fed from the input amplifier tube V1A (Fig. 2b) to the grid of a low impedance generator tube V19A to drive a triode V20A. When the tube V20A is conducting, a constant current generator tube V21A is blocked. When the tube V20A is blocked the tube V21A is passing a current of constant amplitude to a signal element integrating capacitor C28. When the input signal baudel is spacing the capacitor C28 is charged by the flow of current from the tube V21A.

At the end of every baudel, a phase inverter tube V24B, which has square waves obtained from the timing unit 18 applied to the grid, generates two pulses of opposite polarity. The positive pulse is applied to the grid of a take-out tube V25A. If the integrating capacitor C28 has been sufficiently charged so that the anode of the tube V21A is more negative than ground, the tube V25A will conduct when the positive pulse is applied to the grid of the tube V25A and a capacitor C31 will be charged to the same value as the integrating capacitor C28. The capacitor C31 is very small compared to the integrating capacitor C28. This negative voltage developed across the capacitor C31 is applied to the grid of a tube V21B through a capacitor C30 and a positive pulse appears at the anode of the tube V21B. This is known as the spacing pulse and tends to trigger a bistable reciproconductive or locking circuit referred to hereinafter as the regenerated signal circuit 168 to the spacing condition in which the tube V23B is conducting. The time constant of a parallel circuit comprising a resistor R119 and the capacitor C31 tends to elongate the duration of the pulse so that it is very long compared to the pulse applied to the grid of the tube V25A.

If the integrating capacitor C28 is positive when the local positive pulse is applied to the grid of the tube V25A, no charge is developed across the capacitor C31, and, therefore, no spacing pulse is generated.

Simultaneous with the application of the pulse to the grid of the tube V25A, a negative pulse is applied to a triode V20B which controls a clear-out pentode tube V22. The combination of resistors R107, R109, R110 and R111 is arranged to tend to keep the grid of the triode V20B positive, except that grid current keeps the grid clamped to —B. The negative pulse from the cathode of the tube V24B when applied to a time delay network comprising the resistor combination previously mentioned, and the capacitors C33 and C29, is delayed long enough to allow a capacitor C31 in the anode of the take-out tube V25A to charge completely. The negative pulse then blocks the triode V20B completely for a very short time. A positive pulse, called the marking pulse is generated across a pair of series connected resistors R105 and R106 and applied to the regenerated signal circuit 168 tending to trigger the same to the condition in which the tube V23A is conducting. While the tube V20B is blocked the pentode V22 conducts and almost completely removes the charge from the integrating capacitor C28. In the absence of the spacing pulse, the marking pulse triggers the regenerated signal circuit 168 to the marking condition. If both pulses are present, the spacing pulse prevails since it begins earlier and ends later.

The triode V24A is connected to the timing control circuit 18 in such manner that when the latter is in the active condition the tube V24A is conducting, and a slight negative voltage is present on the grid of the tube V20B. This negative voltage due to the action of the clamping tube V24A keeps the tube V20B from conducting fully and the grid of the pentode V22 in the anode circuit of the tube V20B is clamped at a voltage more positive than ground. Clamping the grid of the tube V22 at a positive voltage will keep the integrating capacitor C28 from ever being charged to a negative voltage during idle condition. This is done to eliminate any residual accumulative effect so that the pulse generated at the beginning of the first cycle of the timing oscillator 182 does not produce a spacing pulse.

Clamping the anode circuit of the tube V20B at a positive voltage during idle condition, also clamps the regenerated signal circuit 168 in the marking condition. Thus the regenerator develops a stop baudel in a marking sense independent of the polarity of the stop baudel actually received.

The incoming signal is reproduced in regenerated form at the output of the regenerated signal circuit 168 of the mark/space detector 16 and is applied by means of the output signal selector 12 to the output stage 14.

OUTPUT SIGNAL SELECTOR

The function of the output signal selector 12 is to supply the proper signal to the output stage 14 under all conditions. Under normal conditions, the regenerated signal from the mark/space detector 16 is connected through electronic switch circuitry 122 comprising triodes V3A, V3B, V4A and V4B the output terminals for application to the output stage 14, which is not shown in detail since any of the conventional telegraph circuit output stages may be connected to the switch output terminals 13, 13. During conditions of solid marking or solid spacing, the input signal is connected through the output signal selecting electronic switch circuitry directly to the output terminals 13, 13. Also included in this section are circuits to cause the output stage to operate in the spacing or idle condition in case of failure of components in the regenerator.

The output signal selector as shown in the upper portion of Fig. 2b selects the signal to be presented to the output stage, under any of the circumstances listed below:

(*a*) Normal operation;

(*b*) Solid marking or solid spacing input signal;

(*c*) Failure of the timing unit 18;

(*d*) Failure of the mark/space detector 16.

Under normal operation the timing unit 18 and the mark/space detector 16 function as previously described. The activation of the timing control circuit 18 brings into operation an output switch control circuit, comprising tubes V7A, V3A and V3B. The grid of the tube V3B is held at approximately +25 volts with respect to ground. It should be more positive than the anode of the tube V23B when conducting. The tube V3B will conduct when the cathode is more negative than +25 volts, but when the cathode is much more positive than +25 volts, the tube cannot conduct. The cathode of the tube V3B is connected to the anode of the tube V23B with the result that when the tube V23B is conducting, the tube V3B is also conducting.

The cathode of the tube V3A is connected to the input amplifier tube V1A by way of cascaded amplifier tubes V1B, V2A and V2B. The tube V3A functions in the same manner as does the tube V3B except that when the timing control circuit is activated and the anode voltage of the tube V7A is reduced to approximately −B, the tube V3A cannot conduct, since the grid of the tube V3A is connected to the anode of the tube V7A. As soon as V7A is conducting, a capacitor C2 charges through the tube V7A and resistors R17 and R18. When the timing control circuit is inactivated or idle, the tube V7A stops conducting and the charge on the capacitor C2 begins to discharge through a resistor R19. The time constant of the parallel circuit comprising the resistor R19 and the capacitor C2 is sufficiently long so that if the timing control circuit is reactivated within 100 to 200 milliseconds, the charge on the capacitor C2 is sufficient to keep the tube V3A blocked. Ordinarily, therefore, if automatic transmission of the signal is employed, the tube V3A is continuously blocked so there is no switching involved and signal is continuously transmitted from the tube V23B by way of the switching tube V3B to the output terminals leading to an output stage 14 which is shown in Fig. 1, but not in Fig. 2, since any conventional stage may be used.

When the input signal is solid marking, the regenerator proper is not included in the path from the input stage 10 to the output stage 14. The path is from the tube V1A through the tubes V1B, V2A, V2B and V3A and their associated components, to the output stage 14. When the input is negative which is marking, the tube V1A is blocked and the tube V1B is conducting with the anode driven negative so that the tube V2A is cut off. The cathode of the tube V2A will be essentially at ground potential since the capacitor C1 has no charge. The voltage divider comprising the resistors R13 and R14 is selected to maintain V2B at cutoff. The anode of the tube V2B and the cathode of the tube V3A are at +B so no current flows through the resistor R16. The idle condition of the tube V23B is also non-conducting so that the anode and cathode of V3B are at +B. Thus no current flows through the tube V3B either. In the marking sense no current is passing through the output load resistor R16 and no potential is then applied to the output stage.

If the input signal is solid spacing, that is, no voltage, the tube V1A will conduct causing the tube V1B to be blocked. The anode of the tube V1B and the grid of the tube V2A then reach +B. Since the resistor R10 in the cathode circuit of the tube V2A has a high value of resistance, the tube acts as a cathode follower and the capacitor C1 is charged through the tube V2A to almost +B. Consequently, the tube V2B will conduct and the anode together with the cathode of the tube V3A drop very close to ground potential. If the timing unit 18 has been idle for more than about 200 milliseconds, the grid of the tube V3A will be approximately +25 volts. The tube V3A will conduct through the tube V2B and the resistor R16. In the idle or spacing condition, current is passing through the output load resistor R16 and potential is applied to the output stage 14.

In case the signal is keying and the timing control circuit 181 is inactive for any reason at the first transition from marking to spacing, the capacitor C1 is charged through the tube V2A in a very short time. When the signal reverts to marking, the capacitor C1 begins discharging through the resistors R10, R11, R12, R13 and R14. However, the time constant of this portion of the circuit is very long so the tube V2B will conduct for about 125 milliseconds after input signal had reverted to marking. The output signal will be the same for an input of solid spacing. This insures that keying signals will not be passed from input stage 10 to the output terminals and then to the output stage 14 without being regenerated.

Also included in the unit are two failure notification circuits 121, 123. These circuits apply potential to the output state 14 in the event of failure of the timing unit 18 or failure in the mark/space detector 16. The tubes V8A and V4B supply notice of failure in the timing unit 18. Once the timing control circuit 181 has been activated, one of the functions of the timing unit 18 is to supply a pulse at the proper time to deactivate the timing control circuit 181. Failure of any of the components involved may cause the timing control circuit 181 to remain active. While the timing control circuit is idle, the tube V8A is conducting and the capacitor C3 is charged to nearly —B, and the tube V4B is held blocked. When the timing control circuit 181 is activated, the tube V8A is blocked and the capacitor C3 is discharged through a resistor R23 and if the timing control circuit 181 remains idle longer than the time required to regenerate one character (about 250 milliseconds or more), the capacitor C3 will have discharged sufficiently to allow the tube V4B to conduct and pass current through the output resistor R16. This is the idle or spacing condition. The charging time for the capacitor C3 is very short so that if the timing control circuit is idle for only a few milliseconds, the capacitor C3 will be completely charged.

The second failure notification circuit 123 includes the tubes V4A, V5A, V5B, V6A, V6B and associated components. When the timing control circuit 181 is in its idle condition, the tube V5A is conducting and the voltage developed across the resistor R26 holds the tube V4A blocked. The capacitor C4 is charged through the tube V5A and the resistor R25. The tube V5B may or may not be conducting depending on the condition of the regenerator output indicating reciproconductive circuit 124 comprising the tubes V6A and V6B. Whether the tube V5B is conducting or is non-conducting has no effect on the operation of the circuit at this time. As soon as the timing control circuit 181 is activated, the tube V5A is cut off. A pulse from the anode of the tube V7B is applied through a capacitor C8 to the grid of the tube V6A so that if that tube was conducting it is now blocked. If the tube V6A were blocked it remains so. The grid of the tube V5B is connected to the grid of the tube V6A so that the former conducts when the latter conducts. Since both tubes V5A and V5B are blocked, the capacitor C4 starts to discharge through the resistors R25 and R26. The time constant of this portion of the circuit is such that when approximately $1\frac{1}{3}$ baud elements have elapsed, the tube V4A starts to conduct and pass current through the output load resistor R16. Exactly one baudel after the timing control circuit 181 has been triggered to the active condition, the regenerated start baud element should cause the tube V23B to conduct. The negative voltage developed across the resistor R116 (Fig. 2c) is applied as a pulse through a capacitor C7 (Fig. 2b) to the grid of the tube V6B, blocking the latter, indicating proper output from the mark/space detector 19, and causing the tube V6A and, therefore, tube V5B to conduct. On conducting, the tube V5B restores the charge on the capacitor C4 before the tube V4A has had time to conduct. The absence of the negative pulse from the tube V23B indicates a probable failure in the mark/space detector 16, and the tube V4A is permitted to conduct and thereby indicate such failure by the absence of potential across the output terminals 13, 13. Consequently, if signals are supplied to the input terminals but are not being properly regenerated because of failure in the mark/space detector 16, then the output signal will consist of almost six complete baud elements of spacing followed by a marking "stop" baud element. This corresponds to the transmitted character "blank."

FALSE START DETECTOR

Since the regenerator is set into operation by the first transition from mark-to-space, that is, supposedly the beginning of the start baud element the remote apparatus always puts solid mark on the line to establish the circuit before transmitting the first start element, any transition occurring when the regenerator is not active, whether caused by the start baudel or by a burst of interference, will cause the regenerator to start cycling.

The function of the false start detector 19 is to prevent the regenerator from cycling when a signal other than a true start pulse is received. This is accomplished by comparing the charge on the integrating condenser C28 with a fixed voltage. Insufficient charge on the integrating condenser 28 results in the formation of a pulse which deactivates the timing control circuit 181.

When a negative pulse from the tube V1A triggers the timing control circuit 181 (Fig. 2a), a monostable reciproconductive circuit 191 (Fig. 2b) is triggered in the false start detector 19 as shown in detail in the lower portion of Fig. 2b. This reciproconductive circuit comprising tubes V14B and V23A remains in the triggered or unstable condition for approximately 75 per cent of a baudel. As the monostable reciproconductive circuit 191 returns to the stable condition, a positive pulse of fixed amplitude is generated and applied to a comparing circuit 193. This comparing circuit 193 is also coupled to the spacing signal integrating capacitor C28 (Fig. 2c). The comparing circuit 193 (Fig. 2b) compares the amplitude of the positive pulse with increase in bias due to the increasing negative charge on the integrating capacitor C28. If the magnitude of the negative bias is greater than the amplitude of the positive pulse, the timing control circuit 181 is allowed to remain in the active condition.

If the bias is insufficient to block the positive pulse, the timing control circuit is deactivated or returned to the idle condition thereby.

The false start detector 19 is shown in detail in the lower portion of Fig. 2b. The tubes V26A and V14B constitute the monostable reciproconductive circuit 191 with the tube V14B normally conducting and the tube V26A held nonconducting by the negative voltage developed across a resistor R128.

As soon as a negative pulse from the input tube V1A is applied through the capacitor C9 triggers the timing control circuit 181, a negative voltage is developed across the resistor R39 Fig. 2a and applied through a capacitor C38, a resistor R126 and a capacitor C35 as a negative pulse to the grid circuit of the tube V14B. This pulse triggers the monostable reciproconductive circuit 191 to the unstable state with the tube V26A conducting and the tube V14B blocked. The duration of this unstable condition is limited by the time constant involving the circuit comprising the capacitor C35, and the resistors R127, R131, R132 and R133, which are given values so that the circuit 191 is restored after approximately 75 per cent of a baudel. When the reciproconductive circuit 191 is restored, a positive pulse is generated and applied through the capacitor C36 and the resistor R134 to the comparing circuit 193 comprising the tube V25B, and the resistors R135, R136 and R137. The tube V25B is connected as a cathode follower, and the grid thereof is connected to the floating end of the integrating capacitor C28. The voltage on the cathode of the tube V25B follows the voltage on the grid. The voltage divider comprising the resistors R135, R136 and R137 divides the voltage in such a manner that when the cathode of the tube V25B is at essentially +B, the tube V19B is just biased to the cut-off point. As the capacitor C28 is charged and the cathode of the tube V25B becomes less positive, the bias on the grid of the tube V19B is increased. The relationship between the charging voltage on the integrating capacitor C28 and the increase in bias on the tube V19B is the ratio of the parallel combination of the resistance of resistor R136 and that of the resistor R137 to that of the resistor R135 plus the parallel combination of the resistors R136 and R137.

If the integrating capacitor C28 has been sufficiently charged so that spacing pulse can be generated by the tube V25A, then the increase in bias on the tube V19B is sufficiently large to prevent the fixed amplitude positive pulse which is applied thereto from causing the tube V19B to conduct. If the integrating capacitor C28 has not been sufficiently charged, the positive pulse to the grid of the tube V19B overrides the bias and the tube V19B will become conducting, if the input signal element is not a spacing element at that instant. A negative voltage is developed across the resistor R138 and applied through the capacitor C37 as a negative pulse to the grid of the tube V7B. This pulse blocks the tube V7B thereby restoring the timing control circuit 181 to the idle condition.

The tube V26B and its associated components comprise a gating circuit 196. The cathode of the tube V19B is connected to the anode of the tube V26B. As long as the tube V26B is nonconducting, the cathode of the tube V19B is returned to +B through the resistor R141, thus since the anode and the cathode of the tube V19B are returned to the same potential there can be no anode current flow. When the tube V26B is conducting, the cathode of the tube V19B is connected to ground through the tube V26B. This puts the tube V19B in a position to conduct if a sufficiently large positive pulse is applied to the grid. The tube V26B conducts only when the input signal element is a marking element. It does not conduct when the input signal element is a spacing element. This prevents the timing control circuit from being restored to the idle condition while the input is spacing. This feature coupled with other features to be explained later act to notify the operator of apparatus connected to the output stage 14 of breakdown or failure in certain portions of the regenerator.

The activation and the subsequent inactivation of the timing control circuit 181 by the false start detector 19 all take place before the nominal end of the first baud element, so that in the event of a false start, everything has been inactivated before any signal has been applied to the output stage 14.

Mention was previously made of the gating effect of the tube V26B in the false start detector 19 and which coupled with other circuits would act to notify the operator of breakdown of certain portions of the regenerator. Assume something is wrong with the regenerator somewhere between the junction of the resistors R3, R4 and the integrating capacitor C28, in such a manner that the capacitor C28 can never be charged no matter what the input signal. If the tube V26B was not in the circuit and the cathode of the tube V19B was connected directly to ground, then approximately ¾ baud time after the timing control circuit 181 is activated the pulse from the tube V19B restores the timing control circuit 181 to the idle condition. The operator has no idea of anything being amiss because the input of the output stage 14 would be a permanent marking signal. By inserting the tube V26B in the circuit as shown, the false start detector 19 cannot deactivate the timing control circuit 181 if the input is spacing so the circuit remains active for a full character. Since the integrating capacitor C28 cannot be charged, no spacing pulse can be created by the action of the tube V25A and the tube V23A continues to conduct. Since a negative pulse from the tube V23B is required to block the tube V6B, the absence of this pulse permits the tube V4A to conduct and show spacing output to the output stage 14.

Figure 3:
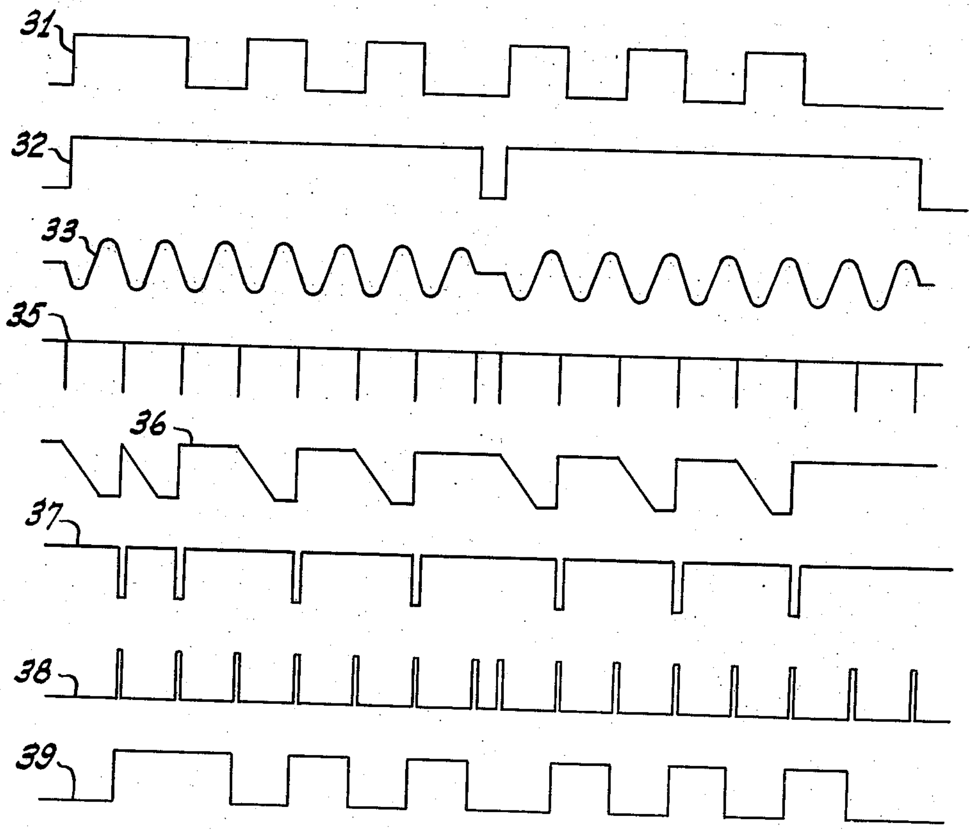

Fig. 3 shows the wave forms appearing at different points of the circuit during the regeneration of two successive received characters, R and Y as expressed in 5-unit code. The stop baud element is shown as 1.4 times as long as the other elements.

Curve 31 represents the received signal RY in terms of input potential, a perfect signal being shown so that the action of the regenerator can be more readily understood. In the diagram, positive is up and negative is down.

Curve 32 represents the voltage at the anode of tube V8B. When it is positive the timing control circuit 181 is active and when it is negative the circuit is idle.

Curve 33 represents the seven cycles of output from the oscillator 182.

Curve 35 represents the negative timing pulses applied to the mark/space detector 16, from the timing unit 18.

Curve 36 represents the charge accumulating on the integrating capacitor C28 during the time the input signal is spacing.

Curve 37 represents the spacing pulses derived from the charge on the integrating capacitor 28. These pulses appear at the end of each spacing baud element and are formed by the application of the pulses shown in curve 35 through the tube V24B to the grid of the tube V25A. These spacing pulses are negative at the anode of the tube V25A and positive at the anode of the tube V21B.

Curve 38 represents the marking pulses formed by the application of the pulses shown in curve 35, through the tube V24B and the delay circuit in the grid of the tube V20B. There is a marking pulse for every pulse generated by the timing unit 18. These marking pulses start later than the spacing pulses and end earlier.

Curve 39 represents the regenerated signal which is identical as shown here to the input signal except that it is displaced one baud element in time.

The operating potential for the circuit arrangement shown in Fig. 2 may be supplied in any known manner. In an actually constructed embodiment two separate regulated rectifier units were employed: one having the positive terminal connected to +B and the negative terminal connected to ground delivering 150 volts regulated at 22 ma. and the other having the negative terminal connected to —B and the positive terminal at ground delivering 150 volts regulated at 23 ma. A tap on the latter rectifier unit provided —200 volts unregulated at 3 ma. for connection to —C. The screen grid of the pentode tube V22 may be connected to a tap on the unregulated portion of the first rectifier unit to provide a higher screen voltage to insure complete discharge of the integrating capacitor C28 if that is found necessary.

In the above mentioned embodiment actually constructed and operated, the following component part values were employed for operation on 5-unit, 1.4 stop pulse printer code at 60 words per minute:

REFERENCE NO. VALUE

*Resistors*

| | |
|---|---|
| R1 | 100 kilohms. |
| R3 | 240 K. |
| R4 | 820 K. |
| R10 | 820 K. |
| R11 | 1 megohm. |
| R12 | 820 K. |
| R13 | 270 K. |
| R16 | 150 K. |
| R17 | 270 K. |
| R18 | 56 K. |
| R19 | 2.2 M. |
| R23 | 2.2 M. |
| R25 | 50 K. |
| R26 | 430 K |
| R37 | 820 K. |
| R38 | 820 K. |
| R39 | 82 K. |
| R66 | 1.5 kilohms. |
| R68 | 22 K. |
| R71 | 1 M. |
| R73 | 300 K. |
| R105 | 56 Klw. |
| R106 | 10 K. |
| R107 | 1 M. |
| R109 | 130 K. |
| R110 | 22 K. |
| R111 | 150 K. |
| R116 | 100 K. |
| R126 | 470 K. |
| R127 | 100 K. |
| R128 | 150 K. |
| R131 | 910 K. |
| R132 | 180 K. |
| R133 | 910 K. |
| R134 | 180 K. |
| R135 | 1.3 M. |
| R136 | 1.2 M. |
| R137 | 1 M. |
| R138 | 560 K. |
| R141 | 100 K. |

*Capacitors*

| | |
|---|---|
| C1 | 0.2 µf. |
| C2 | 0.03. |
| C3 | 0.05. |
| C4 | 0.02. |
| C7 | 0.0005. |
| C8 | 0.0005. |
| C9 | 0.0005. |
| C22 | 1.61 µf. |
| C25 | 0.001. |
| C28 | 0.075. |
| C29 | 0.001. |
| C30 | 0.01 |
| C31 | 0.003. |
| C35 | 0.01. |
| C36 | 0.002. |
| C37 | 0.0005. |
| C38 | 0.0005. |

*Inductor*

| | |
|---|---|
| L | 7.5 henry. |

*Tubes*

| | |
|---|---|
| V1A, V1B | 12AX7. |
| V2A, V2B to V12A, V12B | 12AU7. |
| V13A, V13B, V14A, V14B | 12AX7. |
| V15A, V15B to V21A, V21B | 12AX7. |
| V22 | 6AQ5. |
| V23A, V23B to V26A, V26B | 12AU7. |

The circuit arrangement of Fig. 2 was operated at 75 and 100 words per minute with the values of the critical component capacitors as listed below:

| | Mfd. | Mfd. |
|---|---|---|
| C4 | 0.0164 | 0.0123 |
| C22 | 1.08 | 0.60 |
| C28 | 0.055 | 0.032 |
| C35 | 0.0083 | 0.0062 |

Obviously other keying speeds may be accommodated by the circuit arrangement as disclosed on changing the values of the component parts as will be evident to those skilled in the art.

The invention claimed is:

1. An electronic circuit arrangement for regenerating fixed length, mark/space, telegraph signals of the type wherein one signal element of each character is of different length than the other signal elements, including a pair of input terminals to which the signals as received are applied and a pair of output terminals from which said signals are available in regenerated form, including a mark/space detector having an input circuit coupled to said input terminals and an output circuit arranged to produce mark and space pulses in accordance with the nature of the signal elements applied to the input circuit, output signal selecting electronic switch circuit arranged to couple said output terminals selectively to said input terminals and to the output circuitry of said mark/space detector, an electronic timing control circuit arranged to be activated in response to the receipt of the first signal element of each character, an electronic output signal selecting switch control circuit coupled to said timing control circuit and said output signal selecting electronic switch circuit to cause said output signal selecting electronic switch circuit to couple said output circuit of the mark/space detector to said output terminals when said timing control circuit is active and to couple said input terminals to said output terminals for direct operation when said timing control circuit is idle, said output signal selecting switch control circuit incorporating a time delay whereby said coupling for direct operation is accomplished only after a prearranged time period after said timing control circuit is inactivated, a pulse lengthening circuit interposed in said direct connections between said input and said output terminals to extend the spacing between mark pulses as received at said input terminals, a further mark/space detector circuit arranged to determine the nature of said first signal element only and to inactivate said timing control circuit when said first signal element is of nature opposite to that to which said timing control circuit is arranged to respond, a circuit connection connecting said input terminals to said further mark/space detector circuit to nullify action thereof when the input signal element under consideration is of said opposite nature at the time of detection, another electronic switch connected across said output terminals for indicating failure of said timing control circuit and timing circuit failure switch control circuit incorporating another time delay connected between said timing control circuit and said other electronic switch and arranged to close said other electronic switch after another predetermined time period after said timing control circuit is activated, said other predetermined time period being greater than the time duration of one character of said incoming signal, a further electronic switch connected across said output terminals for indicating mark/space detecting failure and a detector failure switch control circuit having a time delay connected between said timing control circuit and said further electronic switch and arranged to close said further electronic switch after a prearranged time period after said timing control circuit is activated, said prearranged time period being greater than the duration of one signal element of said incoming signal, and a timing wave generating circuit coupled to said timing control circuit to produce a timing wave having a number of cycles equal to the number of elements in each signal character in response to the activation of said timing control circuit, said timing control circuit being inactivated on the last cycle of said timing wave.

2. An electronic circuit arrangement for regenerating fixed length, mark/space, start-stop telegraph signals of the type having a stop signal element longer than the other signal element of each character, including a pair of input terminals to which the signals are applied as received and a pair of output terminals from which said signals are available in regenerated form, including a mark/space detector having an input circuit coupled to said input terminals and a bistable reciproconductive circuit arranged to produce mark and space pulses in accordance with the nature of the signal elements applied to the input circuit of the mark/space detector, an output signal selecting switch electronic switch circuit arranged to couple said output terminals selectively to said input terminals and to said bistable reciproconductive circuit, timing control bistable reciproconductive circuit arranged to be triggered to an active state in response to the receipt of the first signal element of each character, an electronic output signal selecting switch control circuit coupled to said timing control reciproconductive circuit and said output signal selecting electronic switch circuit to cause said electronic switch circuit to couple the first said bistable reciproconductive circuit to said output terminals when said timing control reciproconductive circuit is active and to couple said input terminals to said output terminals for direct operation when said timing control reciproconductive circuit is in the idle state, said output signal selecting switch control circuit incorporating a time delay whereby said coupling for direct operation is accomplished only after a prearranged time period after said other reciproconductive circuit is inactivated, a pulse lengthening circuit interposed in said direct connections between said input and said output terminals to extend the spacing between mark pulses as received at said input terminals, a false-start detector arranged to determine the nature of said first signal element only and to inactivate said timing control reciproconductive circuit when said first signal element is of nature opposite to that to which said other reciproconductive circuit is arranged to respond, a circuit connection connecting said input terminals to said false-start detector to nullify action thereof when the input signal element under consideration is of said opposite nature at the time of detection, another electronic switch connected across said output terminals to indicate failure of the timing control circuit and another switch control circuit incorporating another time delay connected between said timing control reciproconductive circuit and said other electronic switch and arranged to close said other electronic switch after another predetermined time period after said timing control reciproconductive circuit is activated, said other predetermined time period being greater than the time duration of one character of said incoming signal, a further electronic switch connected across said output terminals for indicating failure of the mark/space detector and a detector failure switch control circuit having a time delay connected between said timing control reciproconductive circuit and said other electronic switch and arranged to close said further electronic switch after a prearranged time period after said timing control reciproconductive circuit is activated, said prearranged time period being greater than the duration of one signal element of said incoming signal, and a timing wave generating circuit coupled to said timing control reciproconductive circuit to produce a timing wave having a number of cycles equal to the number of elements in each signal character in response to the activation of said timing control reciproconductive circuit, said timing control reciproconductive circuit being inactivated on the last cycle of said timing wave.

3. An electronic circuit arrangement for regenerating fixed length, mark/space, telegraph signals of the type wherein one signal element of each character is of different length than the other signal elements, including a pair of input terminals to which the signals as received are applied and a pair of output terminals from which said signals are available in regenerated form, including a mark/space detector having an input circuit coupled to said input terminals and an output circuit arranged to produce mark and space pulses in accordance with the nature of the signal elements applied to the input circuit, an output signal selecting electronic switch circuit arranged to couple said output terminals selectively to said input terminals and to the output circuit of said mark/space detector, an electronic timing control circuit arranged to be activated in response to the receipt of the first signal element of each character, an electronic signal selecting switch control circuit coupled to said timing control circuit and said output signal selecting electronic switch circuit to cause the latter electronic switch circuit to couple said output circuit of the mark/space detector to said output terminals when said timing control circuit is active and to couple said input terminals to said output terminals for direct operation when said timing control circuit is idle, said signal selecting switch control circuit incorporating a time delay whereby said coupling for direct operation is accomplished only after a prearranged time period after said timing control circuit is inactivated, timing circuit failure electronic switch connected across said output terminals and a timing circuit failure switch control circuit incorporating another time delay connected between said timing control circuit and said timing circuit failure electronic switch and arranged to close the latter electronic switch after another predetermined time period after said timing control circuit is activated, said other predetermined time period being greater than the time duration of one character of said incoming signal, a detector failure electronic switch connected across said output terminals and a detector failure switch control circuit having a time delay connected between said timing control circuit and said detector failure electronic switch and arranged to close the latter electronic switch after a prearranged time period after said timing control circuit is activated, said prearranged time period being greater than the duration of one signal element of said incoming signal, and a timing wave generating circuit coupled to said timing control circuit to produce a timing wave having a number of cycles equal to the number of elements in each signal character in response to the activation of said timing control circuit, said timing control circuit being inactivated on the last cycle of said timing wave.

4. An electronic circuit arrangement for regenerating fixed length mark/space telegraph signals of the type wherein one signal element of each character is of different length than the other signal elements, including a pair of input terminals to which the signals as received are applied and a pair of output terminals from which said signals are available in regenerated form, including a mark/space detector having an input circuit coupled to said input terminals and an output circuit arranged to produce mark and space pulses in accordance with the nature of the signal elements applied to the input circuit, a circuit selecting electronic switch arranged to couple said output terminals selectively to said input terminals and to the output circuit of said mark/space detector, a timing control circuit arranged to be activated in response to the receipt of the first signal element of each character, a circuit selecting electronic switch control circuit coupled to said timing control circuit and to said circuit selecting electronic switch to cause the latter electronic switch to couple said output circuit of the mark/space detector to said output terminals when said timing control circuit is active and to couple said input terminals to said output terminals for direct operation when said timing control circuit is idle, said circuit selecting switch control circuit incorporating a time delay whereby said coupling for direct operation is accomplished only after a prearranged time period after said timing control circuit is inactivated, and a timing wave generating circuit coupled to said timing control circuit to produce a timing wave having a number of cycles equal to the number of elements in each signal character in response to the activation of said timing control circuit, said timing control circuit being inactivated on the last cycle of said timing wave.

5. A code signal regenerator having input terminals to which code signals as received are applied, a timing wave generator responsive to reception of a single code signal element of given nature coupled to said input terminals to produce a train of timing pulses, a mark/space detector having a code signal element integrating circuit coupled to said input terminals and an output circuit from which regenerated code signals are obtained coupled to said timing wave generator, and a false start detector having an input circuit coupled to the integrating circuit of said mark/space detector and an output circuit coupled to said timing wave generator to prevent operation of the latter when said single code signal element is of nature other than said given nature, the time constant of said false-start detector being less than that of said mark/space detector to prevent the latter from producing a regenerated code signal element in the event that said single code signal element is of nature other than said given nature.

6. In a code signal regenerator having input terminals to which code signals as received are applied and output terminals at which said code signals as regenerated are available, an output load resistor connected to said output terminals, a plurality of electron discharge devices each having an anode electrode, a control grid and a cathode electrode, one of said electrodes of each of said discharge devices being connected to said output load resistor, connections between another of said electrodes of one of said discharge devices and said input terminals, a mark/space detector having an input circuit coupled to said input terminals and an output circuit coupled to another of said electrodes of another of said discharge devices, and means coupled to the control grids of said one and said other discharge devices to couple said input terminals and said output circuit of said mark/space detector selectively to said load resistor.

7. In an electronic circuit for regenerating telegraph signals, a pair of input terminals to which said telegraph signals are applied a generator coupled to said input terminals to produce a timing wave synchronized with said signals, and a mark/space detector including a first vacuum tube having a cathode, a control grid and an anode, an input circuit coupled between the grid and cathode of said first tube and arranged to have said signals applied thereto, a signal element integrating capacitor coupled to the anode of said tube, a second vacuum tube having at least a cathode, a control grid and an anode, the cathode of said second tube being connected to the anode of said first tube and one terminal of said capacitor, the anode of said second tube being connected to the other terminal of said capacitor, a third vacuum tube having a cathode, a control grid and an anode, said cathode being connected to said one terminal of said capacitor and the anode being connected to a shunt resistor-capacitor combination constituting an output load impedance, a fourth vacuum tube having a cathode, a control grid and an anode, the anode of said fourth tube being connected to the grid circuit of said second vacuum tube, a further vacuum tube having a cathode, a control grid and an anode, separate load resistors coupled to the anode and cathode respectively of said further tube, the grid of said third vacuum tube being connected via differentiating circuitry to the anode load resistor of said further tube, the grid of said fourth tube being connected to the cathode load resistor of said further tube, the grid of said further tube being connected to said timing wave generator, a time delay network interposed between said fourth vacuum tube and said further vacuum tube, thereby in sequence to charge said signal element integrating capacitor to a potential indicative of the nature of the individual signal element under consideration, to connect said capacitor through said third vacuum tube to said output load impedance at the end of the signal element under consideration to develop a pulse therein of polarity indicative of elements of one nature only, and an additional vacuum tube having a cathode, a grid and an anode, a resistor coupling the anode of said additional vacuum tube to the cathode of said further vacuum tube and to the grid of said fourth vacuum tube by way of said time delay network, a connection between the grid circuit of said additional vacuum tube to said timing wave generator to clamp the grid of said second vacuum tube at a positive potential to discharge said signal element integrating capacitor in readiness for the succeeding signal element, and to maintain said capacitor discharged in readiness until the succeeding signal element is applied.

8. A timing wave generator for a start-stop telegraph receiving system, including a two-terminal oscillator circuit and an oscillator control circuit comprising three electron discharge structures each having cathode, grid and anode electrodes, resistors connecting the grid and cathode electrodes of said structures to a point of negative potential, the grid electrode of one of said structures being capacitively coupled to the anode electrode of another of said structure, the grid electrode of said other structure being connected to the cathode electrode of the further structure, a resistor connecting the anode of said further structure to a point of positive potential, a timing wave output load resistor connecting the anode electrode of said one structure to a point of potential intermediate the first said points of potential, a tuned circuit coupling the anode electrode of said other structure to said point of intermediate potential, and means to apply potentials to the grid electrode of said further structure to control the production of oscillations of frequency determined by said tuned circuit at said timing wave output load resistor.

9. A timing wave generator for a start-stop telegraph receiving system, including a two-terminal oscillator circuit and an oscillator control circuit comprising three electron discharge structures each having cathode, grid and anode electrodes, resistors connecting the grid and cathode electrodes of said structures to a point of negative potential, the grid electrode of one of said structures being capacitively coupled to the anode electrode of another of said structure, the grid electrode of said other structure being connected to the cathode electrode of the further structure, a resistor connecting the anode of said further structure to a point of positive potential, an output load resistor connected to the anode electrode of said one structure to a point of potential intermediate said points of potential, a tuned circuit coupling the anode electrode of said other structure to said point of intermediate potential, a timing control circuit comprising a bistable reciproconductive circuit triggered to one stable state of equilibrium by received telegraph signals, a connection from said bistable reciproconductive circuit to the grid electrode of said further structure to produce oscillations of frequency determined by said tuned circuit at said output load resistor when said reciproconductive circuit is in said one state of equilibrium, a counting circuit coupled between said output load resistor and said bistable reciproconductive circuit to trigger the latter to the other state of equilibrium thereby to cease production of oscillations at said output load resistor.

10. In an electronic telegraph signal regenerating circuit arrangement of the type having a mark/space detector and regenerator coupled between input terminals to which the signal elements as received are applied and output terminals at which said signal elements are obtained in regenerated form, a timing wave generator coupled to said input terminals to produce a train of pulses synchronized with the reception of said signal elements, a protective circuit connected across said output terminals and coupled to said timing wave generator, said protective circuit comprising a bistable reciproconductive circuit coupled to said timing wave generator to be triggered to one state of equilibrium by application of said pulses and arranged to be triggered to the other state of equilibrium by the output of said mark/space detector applied to said output terminals, an electron discharge tube having the anode-cathode path thereof connected across said output terminals and having a control grid element, a resistance-capacity network coupled to said grid element and having a time constant greater than the time period between said pulses, connections from said timing wave generator to said grid element to block said electron discharge tube on application of said pulses, and connections between said bistable reciproconductive circuit and said grid element to maintain said electron discharge tube blocked only when the output of said mark/space detector is of predetermined nature.

11. In an electronic telegraph signal regenerating circuit arrangement of the type having a mark/space detector and regenerator coupled between input terminals to which the signal elements as received are applied and output terminals at which said signal elements are obtained in regenerated form a timing wave generator coupled to said input terminals to produce a train of pulses synchronized with the reception of said signal elements, a protective circuit connected across said output terminals and coupled to said timing wave generator, said protective circuit comprising a bistable reciproconductive circuit coupled to said timing wave generator to be triggered to one state of equilibrium by application of said pulses and arranged to be triggered to the other state of equilibrium by the output of said mark/space detector applied to said output terminals, an electron discharge tube having the anode-cathode path thereof connected across said output terminals and having a control grid element, a resistance-capacity network coupled to said grid element and having a time constant greater than the time period between said pulses, a vacuum tube arranged to couple said timing wave generator to said grid element to block said electron discharge tube on application of said pulses to the control element of said vacuum tube, and another vacuum tube arranged between said bistable reciproconductive circuit and said grid element to maintain said electron discharge tube blocked only when the output of said mark/space detector at the end of the first signal element is marking.

12. In a regenerator for a mark/space telegraph receiving system including a pair of input terminals to which the signals are applied as received and a pair of output terminals from which said signals are available in regenerated form a mark/space detector having an input circuit connected to said input terminals and an output circuit arranged to produce mark and space signals in accordance with the nature of the signals applied to the input circuit, circuit selecting electronic switch including a pair of electron discharge tubes having the anodes connected to said output terminals, control grids and cathodes, the cathode of one of said tubes being connected to the output circuit of said mark/space detector, the cathode of the other of said tubes being coupled to said input terminals, the grid of said one tube being maintained at a potential normally rendering said one tube conducting to couple said mark/space detector to said output terminals, a circuit selecting electronic switch control circuit having a time delay network interposed therein and connected to the grid of said other tube, said switch control circuit being connected to said mark/space detector and responsive to signals received therein to produce a potential of value and duration at which to maintain said other tube blocked when said received signals are of normal length and to permit said other tube to conduct when said received signals are longer than normal.

13. An electronic circuit arrangement for regenerating fixed length, mark/space, start-stop telegraph signals of the type having a stop signal element longer than the other signal elements of each character, including a pair of input terminals to which the signals are applied as received and a pair of output terminals from which said signals are available in regenerated form, including a mark/space detector having an input circuit coupled to said input terminals and an output circuit comprising a bistable reciproconductive circuit arranged to produce mark and space pulses in accordance with the nature of the signal elements applied to the input circuit of the mark/space detector, circuit selecting electronic switch circuit arranged to couple said output terminals selectively to said input terminals and to said bistable reciproconductive circuit, a timing control reciproconductive circuit arranged to be triggered to an active state in response to the receipt of the first signal element of each character, an electronic circuit selecting switch control circuit coupled to said timing control reciproconductive circuit and said circuit selecting electronic switch circuit to cause the latter electronic switch circuit to couple the first said reciproconductive circuit to said output terminals when said timing control reciproconductive circuit is active and to couple said input terminals to said output terminals for direct operation when said timing control reciproconductive circuit is in the idle state, said circuit selecting switch control circuit incorporating a time delay whereby said coupling for direct operation is accomplished only after a prearranged time period after said timing control reciproconductive circuit is inactivated, a timing control failure electronic switch connected across said output terminals and a timing control failure switch control circuit incorporating another time delay connected between said timing control reciproconductive circuit and said timing control failure electronic switch and arranged to close the latter electronic switch after another predetermined time period after said timing control reciproconductive circuit is activated, said other predetermined time period being greater than the time duration of one character of said incoming signal, a detector failure electronic switch connected across said output terminals and a detector failure switch control circuit having a time delay connected between said timing control reciproconductive circuit and said detector failure electronic switch and arranged to close the latter electronic switch after a prearranged time period after said timing control reciproconductive circuit is activated, said prearranged time period being greater than the duration of one signal element of said incoming signal, and a timing wave generating circuit coupled to said timing control reciproconductive circuit to produce a timing wave having a number of cycles equal to the number of elements in each signal character in response to the activation of said other reciproconductive circuit, said timing control reciproconductive circuit being inactivated on the last cycle of said timing wave.

14. An electronic circuit arrangement for regenerating fixed length, mark/space, start-stop telegraph signals of the type having a stop signal element longer than the other signal elements of each character, including a pair of input terminals to which the signals are applied as received and a pair of output terminals from which said signals are available in regenerated form, including a mark/space detector having an input circuit coupled to said input terminals and an output circuit comprising a bistable reciproconductive circuit arranged to produce mark and space pulses in accordance with the nature of the signal elements applied to the input circuit of the mark/space detector, circuit selecting electronic switch arranged to couple said output terminals selectively to said input terminals and to said bistable reciproconductive circuit, a timing control circuit arranged to be triggered to an active state in response to the receipt of the first signal element of each character, a timing control electronic switch control circuit coupled to said timing control circuit and said circuit selecting electronic switch to cause said circuit selecting electronic switch to couple the first said reciproconductive circuit to said output terminals when said timing control circuit is active and to couple said input terminals to said output terminals for direct operation when said timing control circuit is in the idle state, timing control switch control circuit incorporating a time delay whereby said coupling for direct operation is accomplished only after a prearranged time period after said timing control circuit is inactivated, a detector failure electronic switch connected across said output terminals and a detector failure switch control circuit incorporating another time delay connected between said timing control circuit and said detector failure electronic switch and arranged to close the latter electronic switch after another predetermined time period after said timing control circuit is activated, said other predetermined time period being greater than the time duration of one character of said incoming signal, and a timing wave generating circuit coupled to said timing control circuit to produce a timing wave having a number of cycles equal to the number of elements in each signal character in response to the activation of said timing control circuit, said timing control circuit being inactivated on the last cycle of said timing wave.

15. A timing wave generator for a start-stop telegraph receiving system, including a bistable reciproconductive control circuit arranged to be triggered to one state of equilibrium in response to an applied signal of given nature, an oscillator circuit and an oscillator control circuit comprising three electron discharge structures each having cathode, grid and anode electrodes, resistors connecting the grid and cathode electrodes of said structures to a point of negative potential, the grid electrode of one of said structures being capacitively coupled to the anode electrode of another of said structures, the grid electrode of said other structure being connected to the cathode electrode of the further structure, a resistor connecting the anode of said further structure to a point of positive potential, an output load resistor connecting the anode electrode of said one structure to another point of potential intermediate the first of said points of potential, a tuned circuit coupling the anode electrode of said other structure to said point of intermediate potential, a connection from said bistable reciproconductive control circuit to apply potentials to the grid electrode of said further structure to control the production of oscillations of frequency determined by said tuned circuit at said output load resistor, a counting circuit comprising a plurality of bistable reciproconductive circuits connected in cascade between said output load resistor and said bistable reciproconductive control circuit to count the number of cycles of oscillations produced by said oscillator and to trigger said bistable reciproconductive control circuit to the alternate state of equilibrium upon said count reaching a predetermined number, and a clamping circuit connected between all of said reciproconductive counting circuits and said point of negative potential and responsive to the triggering of said reciproconductive control circuit to said one state to condition said reciproconductive counting circuits in the proper phase relationship for the counting operation.

References Cited in the file of this patent

UNITED STATES PATENTS

| Number | Name | Date |
|---|---|---|
| 2,404,047 | Flory et al. | July 16, 1946 |
| 2,430,547 | Anderson et al. | Nov. 11, 1947 |
| 2,454,089 | Rea et al. | Nov. 16, 1948 |
| 2,474,490 | Pelle | June 28, 1949 |
| 2,536,035 | Cleeton | Jan. 2, 1951 |
| 2,536,578 | Slayton | Jan. 2, 1951 |

FOREIGN PATENTS

| Number | Country | Date |
|---|---|---|
| 533,566 | Great Britain | Feb. 17, 1941 |